(12) United States Patent
Ichimi

(10) Patent No.: US 9,268,874 B2
(45) Date of Patent: Feb. 23, 2016

(54) INFORMATION PROCESSING APPARATUS FOR RECEIVING SCREEN INFORMATION FROM A WEB SERVER AND DISPLAYING A WEB BROWSER SCREEN, AND CONTROL METHOD THEREFOR, STORAGE MEDIUM, AND INFORMATION PROCESSING SYSTEM AND INFORMATION PROCESSING METHOD

(75) Inventor: Hideshi Ichimi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 610 days.

(21) Appl. No.: 13/526,645

(22) Filed: Jun. 19, 2012

(65) Prior Publication Data

US 2013/0007593 A1    Jan. 3, 2013

(30) Foreign Application Priority Data

Jul. 1, 2011 (JP) .................. 2011-147741

(51) Int. Cl.
  *G06F 17/00* (2006.01)
  *G06F 17/30* (2006.01)

(52) U.S. Cl.
  CPC ................ *G06F 17/30905* (2013.01)

(58) Field of Classification Search
  None
  See application file for complete search history.

(56) References Cited

U.S. PATENT DOCUMENTS

| | | | |
|---|---|---|---|
| 6,292,185 B1* | 9/2001 | Ko et al. | 715/763 |
| 7,149,982 B1* | 12/2006 | Duperrouzel | G06F 3/0481 715/778 |
| 7,321,917 B2* | 1/2008 | Durham | 709/203 |
| 7,676,762 B2* | 3/2010 | Shafron | 715/826 |
| 8,838,672 B2* | 9/2014 | Kendall et al. | 709/203 |
| 2007/0044133 A1* | 2/2007 | Hodecker | 725/117 |
| 2008/0276182 A1* | 11/2008 | Leow | H04M 1/72525 715/740 |
| 2009/0228814 A1* | 9/2009 | Kobayashi | 715/764 |
| 2012/0260192 A1* | 10/2012 | Detweiler | G06Q 30/02 715/745 |

FOREIGN PATENT DOCUMENTS

| | | |
|---|---|---|
| JP | 2003-271477 A | 9/2003 |
| JP | 2003-526131 A | 9/2003 |
| JP | 2008-186065 A | 8/2008 |
| JP | 2009-176231 A | 8/2009 |
| JP | 2011-130326 A | 6/2011 |

OTHER PUBLICATIONS

"Codeverge: disabling toolbar,menubar,addressbar of the browser", retrieved from http://codeverge.com/asp.net.client-side/disabling-toolbar-menubar-addressbar-of-t/267456.*
Japanese Office Action issued in corresponding application No. 2011-147741 issued on Jul. 17, 2015.

* cited by examiner

*Primary Examiner* — Stephen Hong
*Assistant Examiner* — Sanchita Roy
(74) *Attorney, Agent, or Firm* — Carter, DeLuca, Farrell & Schmidt, LLP

(57) ABSTRACT

A web browser setting value that decides a display specification of a web browser screen is set, and that display specification of the web browser screen is held. An instruction for displaying a web browser screen is transmitted to a web server, and in the case where the response to the instruction includes information indicating whether the display specification of the browser screen is to be taken over, the web browser screen is displayed based on screen information from the web server in accordance with the held display specification of the browser screen.

7 Claims, 15 Drawing Sheets

FIG. 7

| WEB BROWSER SETTING VALUES | |
|---|---|
| RESTRICT DISPLAY OF TOOLBAR ADDRESS PORTION | ON ~701 |
| RESTRICT DISPLAY OF TOOLBAR BUTTONS | ON ~702 |
| MAXIMIZED DISPLAY MODE | ON ~703 |
| TAKE-OVER IDENTIFIER | DOMAIN ~704 |

FIG. 13

WEB BROWSER FAVORITE INFORMATION

| | | 1309 | 1310 |
|---|---|---|---|
| FAVORITE NO. | 1301 | No1 | No2 |
| BUTTON NAME | 1302 | ScanToFTP | Web Access2 |
| URL | 1303 | http://172.12.34.56/xxxx/index.html | http://www.xxx.yyy.zzz/index.htm |
| WEB BROWSER SETTING VALUES | 1304 | STORE | DO NOT STORE |
| RESTRICT DISPLAY OF TOOLBAR ADDRESS PORTION | 1305 | ON | |
| RESTRICT DISPLAY OF TOOLBAR BUTTONS | 1306 | ON | |
| MAXIMIZED DISPLAY MODE | 1307 | ON | |
| TAKE-OVER IDENTIFIER | 1308 | DOMAIN | |

INFORMATION PROCESSING APPARATUS FOR RECEIVING SCREEN INFORMATION FROM A WEB SERVER AND DISPLAYING A WEB BROWSER SCREEN, AND CONTROL METHOD THEREFOR, STORAGE MEDIUM, AND INFORMATION PROCESSING SYSTEM AND INFORMATION PROCESSING METHOD

BACKGROUND OF THE INVENTION

1. Field of the Invention

The present invention relates to an information processing apparatus, a control method therefor, a storage medium, an information processing system, and an information processing method.

2. Description of the Related Art

Conventionally, a screen for displaying a web browser for handling web applications is provided with display areas such as a title bar, a status bar, and a tool bar. Also, the display or non-display of these display areas can be set not only from the web browser options, but also by being described in a scripting language called JavaScript (registered trademark) in content on the web application side.

Here, in the case where such a scripting language description is provided on the web application side, there is normally envisioned to be a desire to include such a description on only the first page of the web application, and have the following pages use the information set in the first page. However, depending on the type of web browser that is used, there are cases where according to the specifications, a web browser setting value is not maintained unless the same script description is included in not only the first page, but also all of the following pages.

On the other hand, there has been a proposal for a technique according to which, with web applications running in a web browser, even in the case of moving to a web application at a completely different domain, session information necessary for application processing and other necessary information is taken over (see Japanese Patent Laid-Open No. 2003-271477).

However, with the taking over of information according to the technique proposed in Japanese Patent Laid-Open No. 2003-271477, consideration is merely given to the taking over of only web application information, and no consideration is given to the taking over of a setting value of the web browser that is running a web application. For example, assume the case where there is a web application A and a web application B that is at a different domain but positioned as a subsystem. Assume also that regardless of the fact that there is a web browser setting for displaying the title bar in the first page of the web application A, there is a setting for non-display of the title bar in the first page of the web application B to which the screen transitions. In such a case, regardless of the fact that the user thinks the web application B is part of the web application A, the operation of the web browser changes when the web application switch is made, thus resulting in a decline in operability.

Also, compared to the title bar area of a web browser handled by a PC, the proportion of the title bar area to the screen is higher with a web browser running on an image forming apparatus, and therefore the user will feel a greater sense of unpleasantness. Moreover, although it is conceivable for a web application developer to use a method of including the same script description on all pages so as to not be dependent on web browser specifications, constantly maintaining the same description involves very burdensome maintenance. As described above, there is the problem that in the case of operating web applications on the same domain or web applications that cross different domains, web browser setting values, that is to say, web browser operation specifications cannot be easily taken over according to the objective.

SUMMARY OF THE INVENTION

The present invention enables realization of a technique that enables controlling whether a web browser screen display specification is to be taken over in accordance with a web server instruction.

One aspect of the present invention provides an information processing apparatus for receiving screen information from a web server and displaying a web browser screen, the information processing apparatus comprising: a setting unit configured to set a web browser setting value that decides a display specification of the web browser screen; a holding unit configured to hold the display specification of the web browser screen that was set by the setting unit; a determination unit configured to transmit an instruction for displaying a web browser screen to the web server, and determine, with respect to a response to the instruction, whether or not a display specification of the browser screen is to be taken over; and a control unit configured to perform control such that in a case where the determination unit has determined that the display specification of the browser screen is to be taken over, the web browser screen is displayed based on screen information from the web server in accordance with the display specification of the browser screen that is held in the holding unit.

Another aspect of the present invention provides an information processing apparatus control method for controlling an information processing apparatus that receives screen information from a web server and displays a web browser screen, the method comprising: setting, with a setting unit of the information processing apparatus, a web browser setting value that decides a display specification of the web browser screen; holding, with a holding unit of the information processing apparatus, the display specification of the web browser screen that was set in the setting step; transmitting an instruction for displaying a web browser screen to the web server, and determining, with respect to a response to the instruction, whether or not a display specification of the browser screen is to be taken over, with a determination unit of the information processing apparatus; and performing control, with a control unit of the information processing apparatus, such that in a case where it was determined in the determination step that the display specification of the browser screen is to be taken over, the web browser screen is displayed based on screen information from the web server in accordance with the display specification of the browser screen that is held in the holding step.

Still another aspect of the present invention provides a non-transitory computer-readable storage medium storing a computer program for causing a computer to execute the information processing apparatus control method.

Still yet another aspect of the present invention provides an information processing system having a web server and an information processing apparatus for receiving screen information from the web server and displaying a web browser screen, wherein the web server receives an instruction for displaying a web browser screen from the information processing apparatus and transmits, to the information processing apparatus, response information that includes information indicating whether a display specification of the web browser screen is to be taken over, and the information processing apparatus comprises: a setting unit configured to set a web browser setting value that decides a display specification of the web browser screen; a holding unit configured to hold the display specification of the web browser screen that was set by the setting unit; and a control unit configured to perform control such that in a case where the response information includes information indicating that the display specification of the browser screen is to be taken over, the web browser screen is displayed based on screen information from the web server in accordance with the display specification of the browser screen that is held in the holding unit.

Yet still another aspect of the present invention provides an information processing method in an information processing system having a web server and an information processing apparatus for receiving screen information from the web server and displaying a web browser screen, the method comprising: in the web server, receiving an instruction for displaying a web browser screen from the information processing apparatus, and transmitting, to the information processing apparatus, response information that includes information indicating whether a display specification of the web browser screen is to be taken over, and in the information processing apparatus, setting, with a setting unit, a web browser setting value that decides a display specification of the web browser screen; holding, with a holding unit, the display specification of the web browser screen that was set in the setting step; transmitting an instruction for displaying a web browser screen to the web server, and determining whether or not a response to the instruction includes information indicating that a display specification of the browser screen is to be taken over, with a determination unit; and performing control, with a control unit, such that in a case where it was determined in the determination step that the response includes information indicating that the display specification of the browser screen is to be taken over, the web browser screen is displayed based on screen information from the web server in accordance with the display specification of the browser screen that is held in the holding step.

Further features of the present invention will be apparent from the following description of exemplary embodiments with reference to the attached drawings.

BRIEF DESCRIPTION OF THE DRAWINGS

FIG. 7 is a diagram illustrating held information that was set in the web browser setting screen shown in FIG. 5.

FIG. 13 is a diagram showing an example of favorite information that was registered in Embodiment 2.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
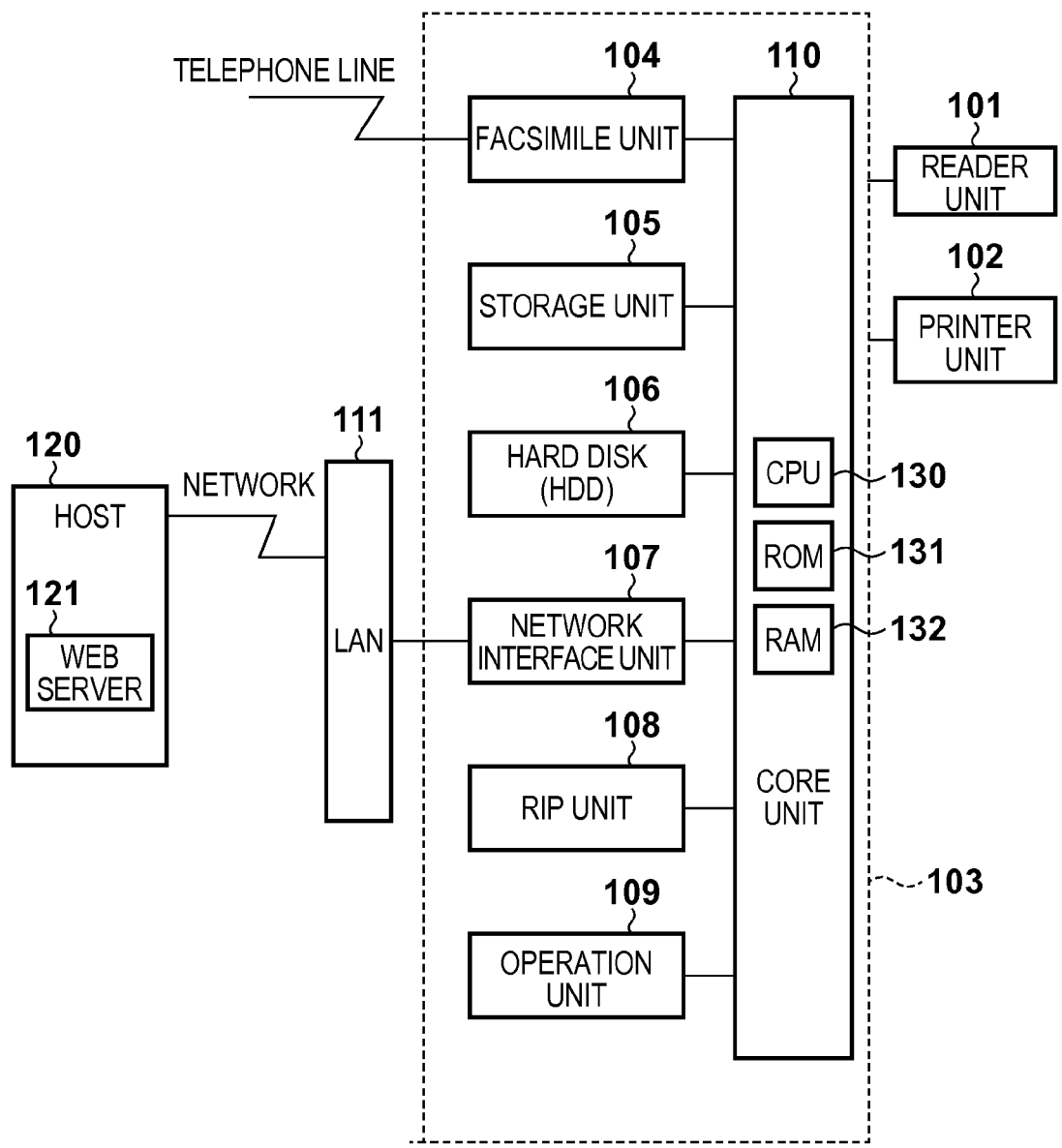
FIG. 1 is a block diagram showing an example of a configuration of an information processing system that includes an image forming apparatus according to embodiments of the present invention.

FIG. 1 is a block diagram showing an example of the configuration of an information processing system that includes an image forming apparatus according to embodiments of the present invention.

This image forming apparatus has an image input/output control unit 103, a reader unit 101, and a printer unit 102. The reader unit 101 reads an image of an original and outputs image data corresponding to the image of the original to the image input/output control unit 103. The printer unit 102 records (prints) an image corresponding to the image data supplied from the image input/output control unit 103 onto a recording sheet. The image input/output control unit 103 is connected to the reader unit 101 and the printer unit 102, and has a facsimile unit 104, a storage unit 105, an HDD 106, a network interface unit 107, an RIP unit 108, an operation unit 109, a core unit 110, and the like. A host 120 serving as an information terminal is internally equipped with a web server 121, and the host 120 can be accessed from the operation unit 109 via a LAN 111.

The facsimile unit 104 decompresses compressed image data that was received via a telephone line and transfers the decompressed image data to the core unit 110, and also compresses image data that was transferred from the core unit 110 and transmits the compressed image data via the telephone line. The image data that is transmitted and received here can be temporarily stored in the hard disk (HDD) 106 that is connected to the storage unit 105.

The storage unit 105 compresses image data that was transferred from the core unit 110, and stores the compressed image data in the hard disk 106 along with an ID number for searching for that image data. The storage unit 105 also searches for compressed image data that is stored in the hard disk 106 based on code data that was transferred via the core unit 110, reads out and decompresses the found compressed image data, and transfers the decompressed image data to the core unit 110. The network interface unit 107 is an interface between the LAN 111 and the core unit 110.

The RIP unit 108 develops code data (PDL) that was transferred from the LAN 111 into image data that can be printed by the printer unit 102. The operation unit 109 includes a touch panel display and a keyboard, and is used for, for example, giving operation instructions and making operation settings with respect to the image forming apparatus via a user interface. The image forming apparatus has functions such as copy, send, box, and a web browser as applications, and can provide functions such as copying, printing, document transmission, document storage, and web browsing.

The core unit 110 controls the flow of data between the reader unit 101, the printer unit 102, the facsimile unit 104, the storage unit 105, the network interface unit 107, the RIP unit 108, and the operation unit 109. The core unit 110 includes a CPU 130, a ROM 131, a RAM 132, and the like, and performs overall control of the image forming apparatus through a program stored in the ROM 131 being executed by the CPU on the RAM 132. The web server 121 is in the host 120, and returns a response to a requester in accordance with a web page request via the LAN 111.

Figure 2:
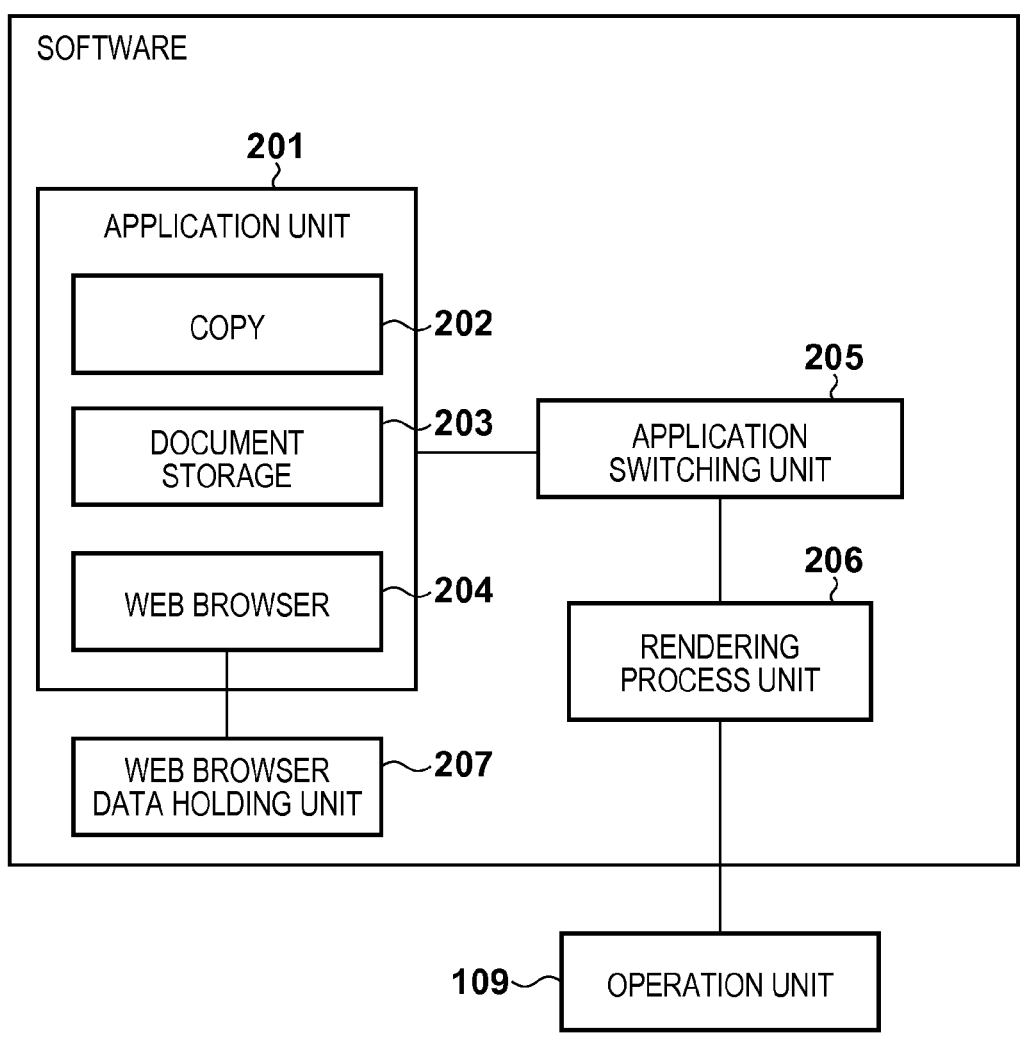
FIG. 2 is a block diagram illustrating a software configuration of the image forming apparatus according to the embodiments.

FIG. 2 is a block diagram illustrating a software configuration of the image forming apparatus according to the embodiments.

Here, the image forming apparatus mainly includes an application unit 201, an application switching unit 205, and a rendering process unit 206. The application unit 201 provides applications including user interfaces, such as copy 202, document storage 203, and web browser 204. The application switching unit 205 switches the applications of the application unit 201 as necessary.

A web browser data holding unit 207 is a data holding unit exclusively for the web browser application, that is to say, the hard disk 106 or the RAM of the core unit 110. Screens that are displayed by applications of the application unit 201 and operated by a user are displayed by a display unit of the operation unit 109 via the rendering process unit 206. The application unit 201 also receives an instruction from the user that was given using the operation unit 109, and executes application processing.

Figure 3:
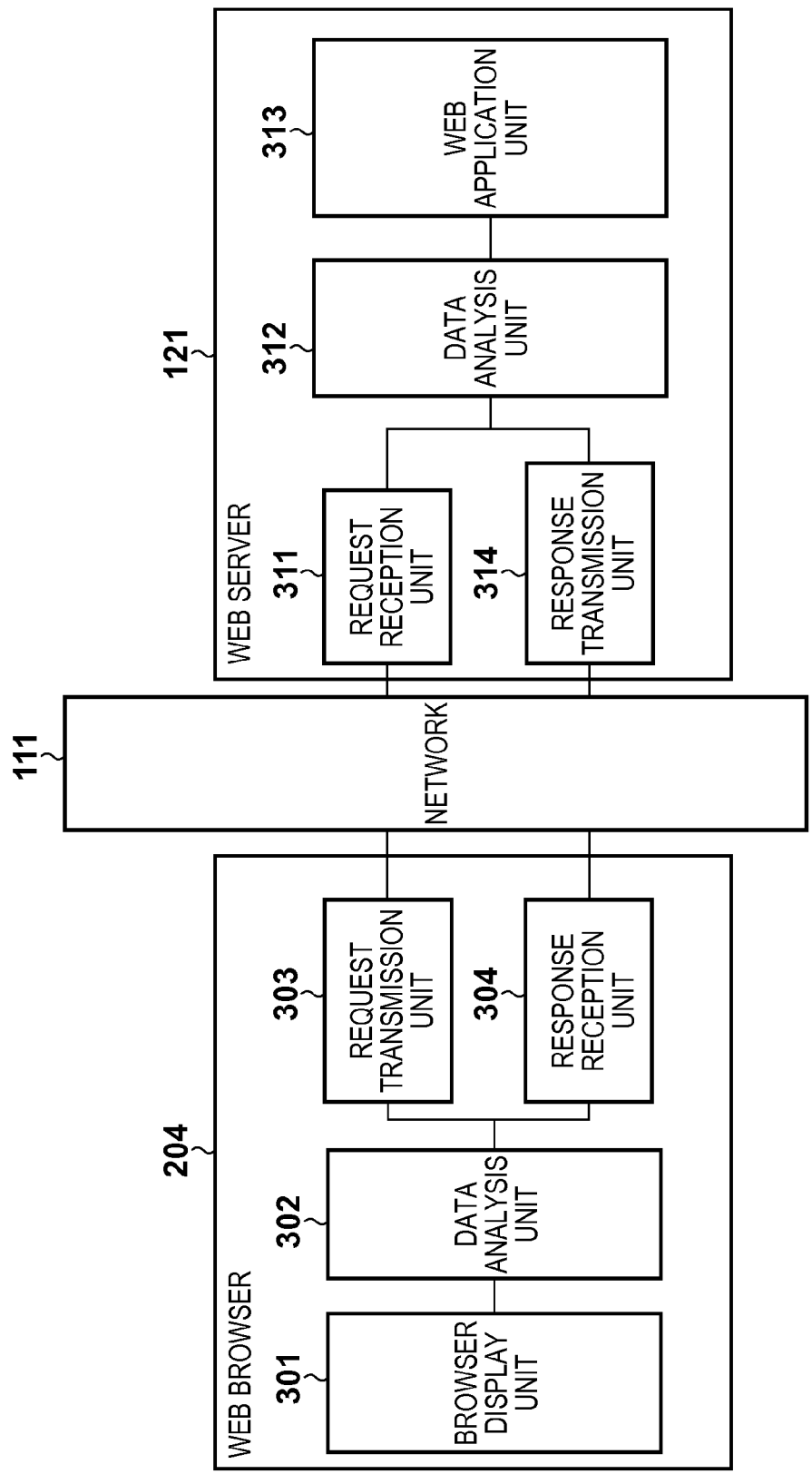
FIG. 3 is a block diagram illustrating a web server capable of communicating via a network with a web browser incorporated in the image forming apparatus according to the embodiments.

FIG. 3 is a block diagram illustrating the web server 121 that is capable of communicating via the network with the web browser 204 incorporated in the image forming apparatus according to the embodiments.

The web browser 204 has a browser display unit 301, a data analysis unit 302, a request transmission unit 303, and a response reception unit 304. The browser display unit 301 displays a web browser screen based on HTML-formatted page content (screen information) that was received from the web server 121. The data analysis unit 302 analyzes content instructed from the browser display unit 301, and transfers the analyzed content to the request transmission unit 303. The data analysis unit 302 also analyzes response content received from the web server 121, and transfers the analyzed content to the browser display unit 301. The request transmission unit 303 attaches the content analyzed by the data analysis unit 302 to request information, and transmits the resulting request information to the web server 121. The response reception unit 304 transfers response information that was received from the web server 121 to the data analysis unit 302.

Next, the web server 121 has a request reception unit 311, a data analysis unit 312, a web application unit 313, and a response transmission unit 314. The request reception unit 311 receives request information from the web browser 204, and transfers the request information to the data analysis unit 312. The data analysis unit 312 analyzes the received request information, and transfers the analyzed content to the web application unit 313 in order to acquire information that is to be returned as a response. The web application unit 313 acquires data that is to be displayed in the web browser 204, performs calculation and the like, and transfers the result to the data analysis unit 312. The response transmission unit 314 transmits, as response information, data that is to be displayed in the web browser 204 to the web browser 204 via the network.

Figure 4:
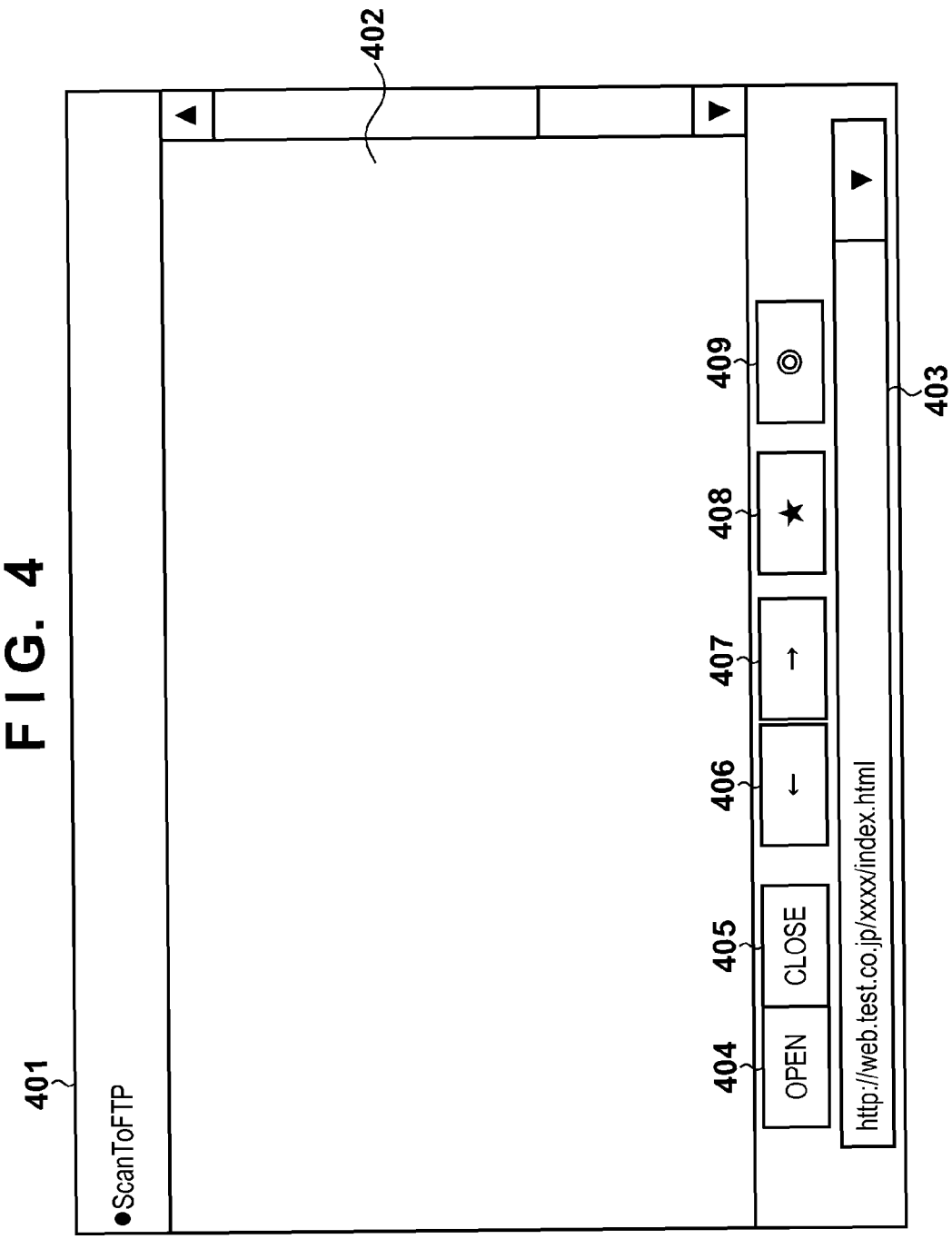
FIG. 4 is a diagram showing an example of a web browser screen in which an operation unit of the image forming apparatus according to the embodiments is displayed.

FIG. 4 is a diagram showing an example of a web browser screen displayed by the operation unit 109 of the image forming apparatus according to the embodiments.

This web browser screen is displayed by the display unit of the operation unit 109, and processing corresponding to operations performed on this screen is executed by the core unit 110 that includes the CPU 130. The web browser screen displayed by the operation unit 109 displays web page content that was transmitted from the web server 121 by communicating with the web server 121 via the network interface unit 107 and the LAN 111.

This web browser screen includes a title display area 401 and a content display area 402 that respectively reflect page content that was called from a URL that was input in a URL input area 403 and later-described favorite page content. Reference numerals 404 to 409 indicate function buttons of the web browser screen. An open button 404 is for opening a new tab page, a close button 405 is for closing a selected tab page, a back button 406 is for reverting the displayed content to the previous page, and a forward button 407 is for moving the displayed content to the next page. Furthermore, a button 408 is for displaying a favorite screen, and a function button 409 is for opening a web browser setting screen.

Figure 5:
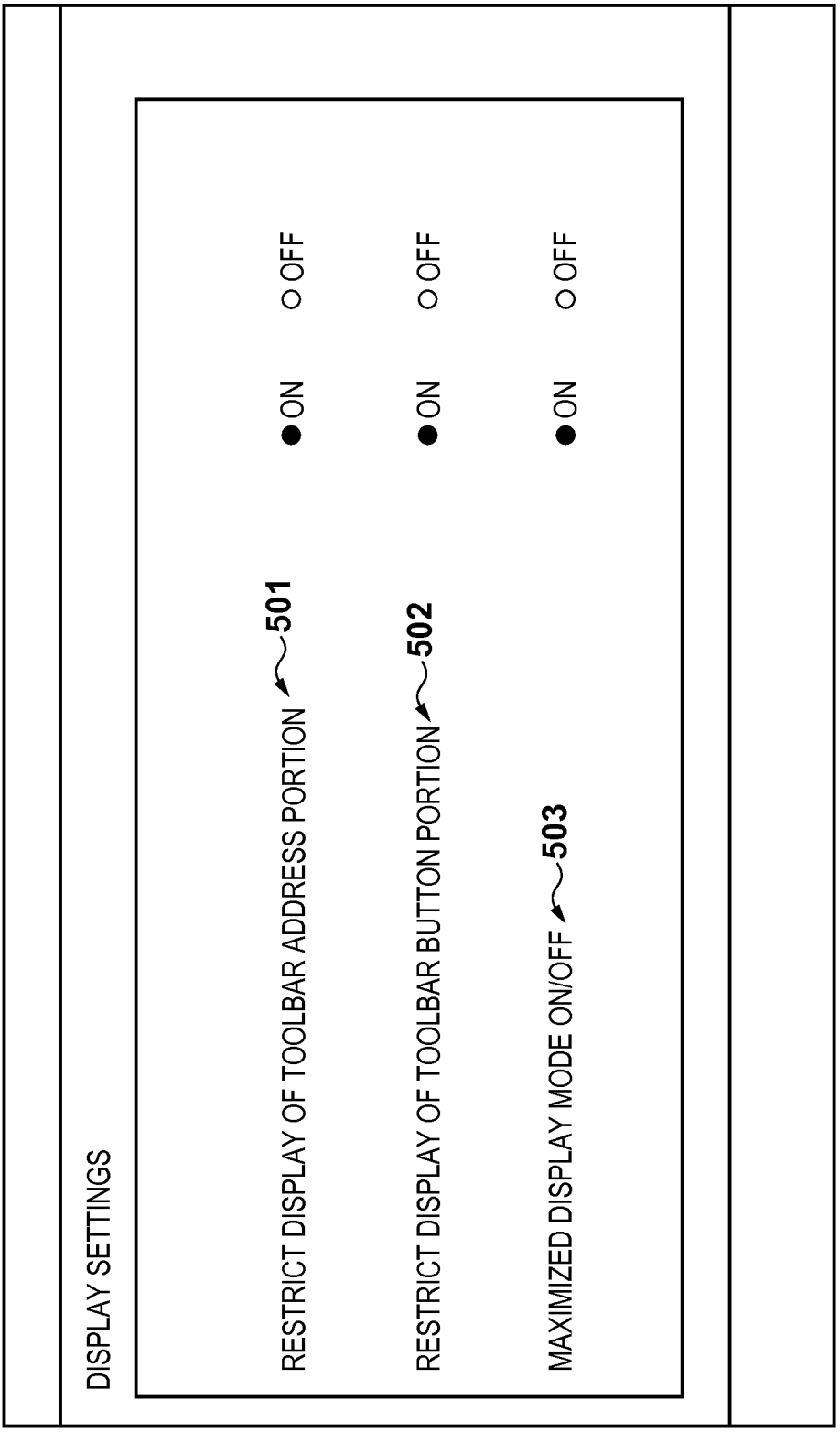
FIG. 5 is a diagram showing an example of a web browser setting screen.

FIG. 5 is a diagram showing an example of a setting screen of the web browser 204. This setting screen is a screen for setting web browser setting values that decide the display specifications of the web browser screen. This web browser setting screen is an example of a screen that is displayed after the function button 409, which is for opening the web browser setting screen, is pressed. A "Restrict display of toolbar address portion" setting item 501 enables setting whether the URL input area 403 of the web browser screen in FIG. 4 is to be displayed. The URL input area 403 is not displayed if "ON" is selected for this setting item, and the URL input area 403 is displayed if "OFF" is selected for this setting item.

A "Restrict display of toolbar button portion" setting item 502 enables setting whether the function buttons 404 to 409 of the web browser screen in FIG. 4 are to be displayed. The function buttons 404 to 409 are not displayed if "ON" is selected for this setting item, and the function buttons 404 to 409 are displayed if "OFF" is selected for this setting item.

A "Maximized display mode ON/OFF" setting item 503 enables setting whether the title display area 401 of the web browser screen in FIG. 4 is to be displayed. The title display area 401 is not displayed if "ON" is selected for this setting item, and the title display area 401 is displayed if "OFF" is selected for this setting item.

Although these web browser setting items can normally be set by an administrator via the operation unit 109, they can also be instructed from the web application using a description in the JavaScript language.

Also, the setting items 501 to 503 shown in FIG. 5 are representative setting items, and although many other setting items are held, descriptions thereof will not be given since focus is placed mainly on the setting items 501 to 503 in the embodiments.

Figure 6:
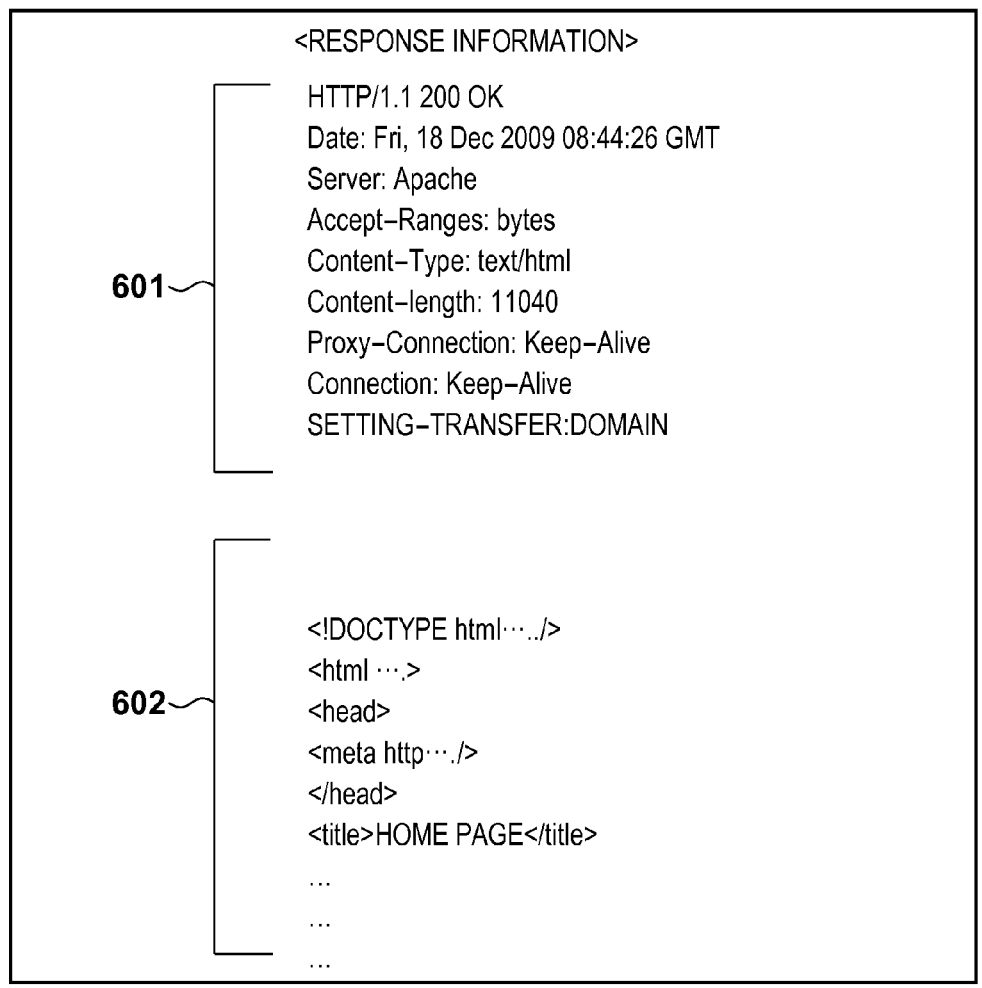
FIG. 6 is a diagram showing an example of response information received by a response reception unit of the web browser.

FIG. 6 is a diagram showing an example of response information that was received by the response reception unit 304 of the web browser 204.

This response information includes response header information 601 and an HTML description 602 for displaying a screen. Here, "SETTING-TRANSFER" in the response header information 601 is required header information in the embodiments, and does not exist in normal response information. This header indicates special header information instructed from the web application. Note that although the name of this header can be determined arbitrarily, it is assumed that the web application and the web browser 204 handle the same name.

The following describes the significance of the value of "SETTING-TRANSFER" indicated in the response header information 601. This header value indicates the extent to which web browser setting values such as those shown in the web browser setting screen in FIG. 5 are to be taken over after the screen described in the header. For example, in the case where the value of "SETTING-TRANSFER" is "DOMAIN" as shown in FIG. 6, the setting values of the web browser 204 are to always be taken over as long as the domain is the same as the domain of the URL of the web application. On the other hand, in the case where the value of "SETTING-TRANSFER" is "ALL", the setting values of the web browser 204 are to always be taken over regardless of the domain of the web application. Next, specific processing content of the embodiments will be described with reference to FIGS. 7 and 8.

FIG. 7 is a diagram illustrating held information that was set in the web browser setting screen shown in FIG. 5.

This information is held in a data storage unit exclusively for the web browser application indicated by the web browser data holding unit 207, that is to say, the hard disk 106 or the RAM 132 of the core unit 110.

Among the web browser setting values shown in FIG. 7, setting values 701 to 703 respectively hold the values set by the setting items 501 to 503 shown in FIG. 5. Also, a web browser setting value 704 holds the value of "SETTING-TRANSFER" of the response header information 601 shown in FIG. 6.

Figure 8:
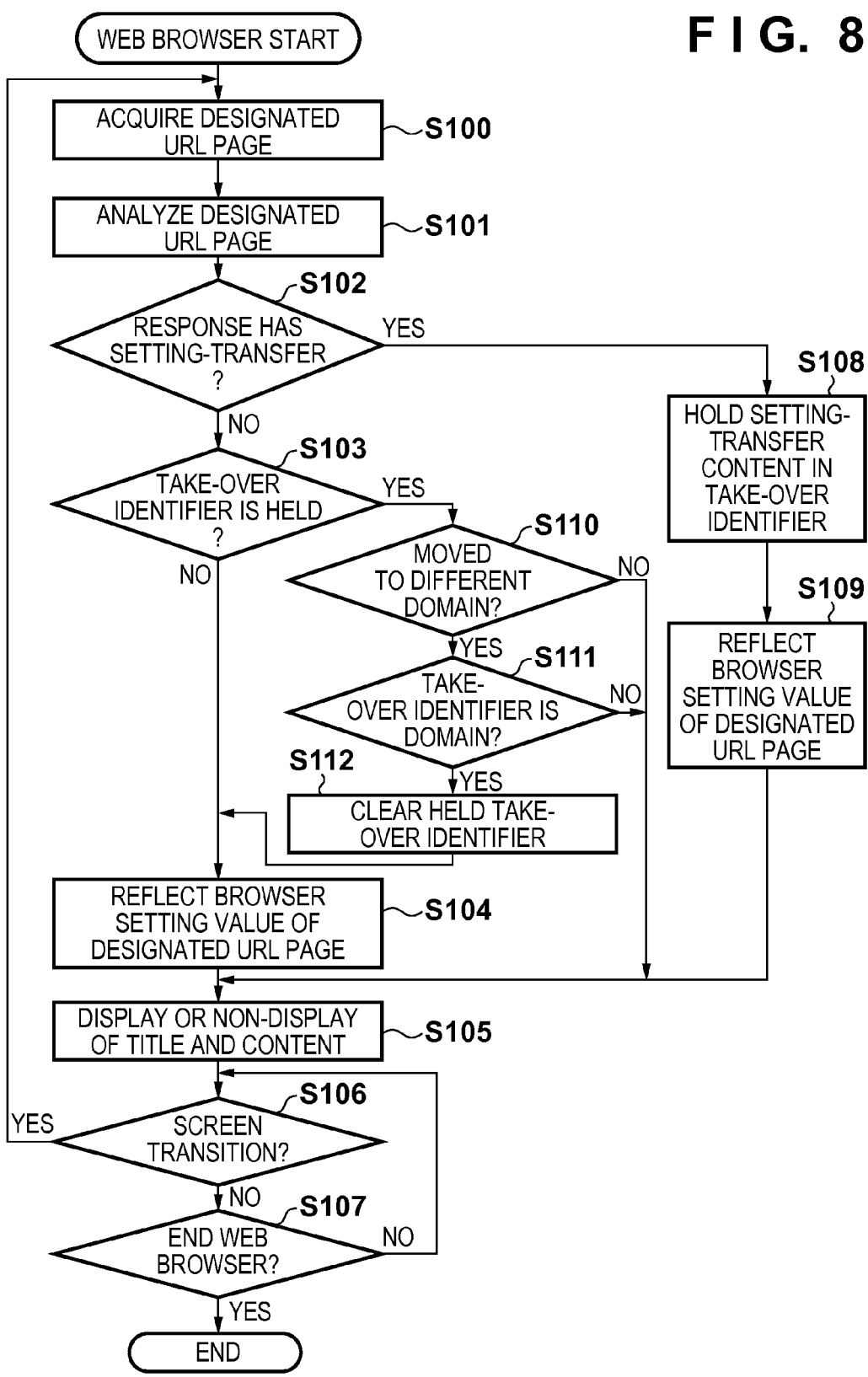
FIG. 8 is a flowchart illustrating web browser screen display processing performed by the image forming apparatus according to the embodiments.

FIG. 8 is a flowchart illustrating web browser screen display processing performed by the image forming apparatus according to the embodiments. Note that a program for executing this processing is stored in the ROM 131, and this processing is achieved by the CPU 130 executing this program.

First, in step S100, an instruction is received from the user, and a designated URL page is acquired from the web server 121. Next, the procedure moves to step S101, in which the content of the page acquired in step S100 is analyzed. Next, the procedure moves to step S102, in which it is determined, based on the result of the analysis performed in step S101, whether the response header information 601 includes the "SETTING-TRANSFER" item. Here, in the case where it is determined that the "SETTING-TRANSFER" item is included, the procedure moves to step S108, in which the value of "SETTING-TRANSFER" is held in a take-over identifier 704. The procedure then moves to step S109, in which settings of the web browser 204 are reflected in the web browser setting values 701 to 703 in accordance with the JavaScript described in the designated URL page. In this way, when the processing of step S109 ends, the procedure moves to step S105, in which the title and content of the designated URL page are displayed or not displayed in accordance with the setting values.

On the other hand, in the case where it is determined in step S102 that the "SETTING-TRANSFER" item is not included, the procedure moves to step S103, in which it is determined whether the take-over identifier 704 is being held. In the case where it is determined here that the take-over identifier 704 is not being held, the procedure moves to step S104. In step S104, in the case where the designated URL page includes a JavaScript description for setting web browser setting values, the setting values are reflected in the web browser setting values 701 to 703.

On the other hand, in the case where it is determined, as a result of the determination in step S103, that the take-over identifier 704 is being held, and values have been set, the procedure moves to step S110, in which it is determined whether the URL designated by the user instruction is on a different domain from the domain of the previous URL. In the case where it is determined here that the domain is not different, the procedure moves to step S105 without any special processing being performed, and the title and content of the designated URL are displayed or not displayed in the same manner as the previous URL.

On the other hand, in the case where it is determined in step S110 that the domain is different, the procedure moves to step S111, in which it is determined whether the value of the take-over identifier 704 is "DOMAIN". In the case where it is determined here that the value of the take-over identifier 704 is not "DOMAIN", the procedure moves to step S105 without any special processing being performed, and the title and content of the designated URL are displayed. On the other hand, in the case where it is determined in step S111 that the value of the take-over identifier 704 is "DOMAIN", the procedure moves to step S112, in which the value of the take-over identifier 704 is cleared, and then the procedure moves to step S104. In step S104, in the case where the designated URL page includes a JavaScript description for setting web browser setting values, the content of that description is reflected in the web browser setting values 701 to 703, and then the procedure moves to step S105.

Next, the procedure moves to step S106, in which after the content of the designated URL is displayed or not displayed in step S105, it is determined whether another screen transition was instructed. In the case where it was determined here that a screen transition was instructed, the procedure returns to step S100, and the above-described series of processing is executed.

On the other hand, in the case where it is determined in step S106 that a screen transition was not instructed, the procedure moves to step S107, in which it is determined whether the web browser is to be ended. In the case where it is determined that the web browser is not to be ended, the procedure returns to step S106, in which it is again determined whether a screen transition was instructed. On the other hand, in the case where it is determined in step S107 that the web browser is to be ended, the processing of the web browser is ended.

Embodiment 1

Figure 9:
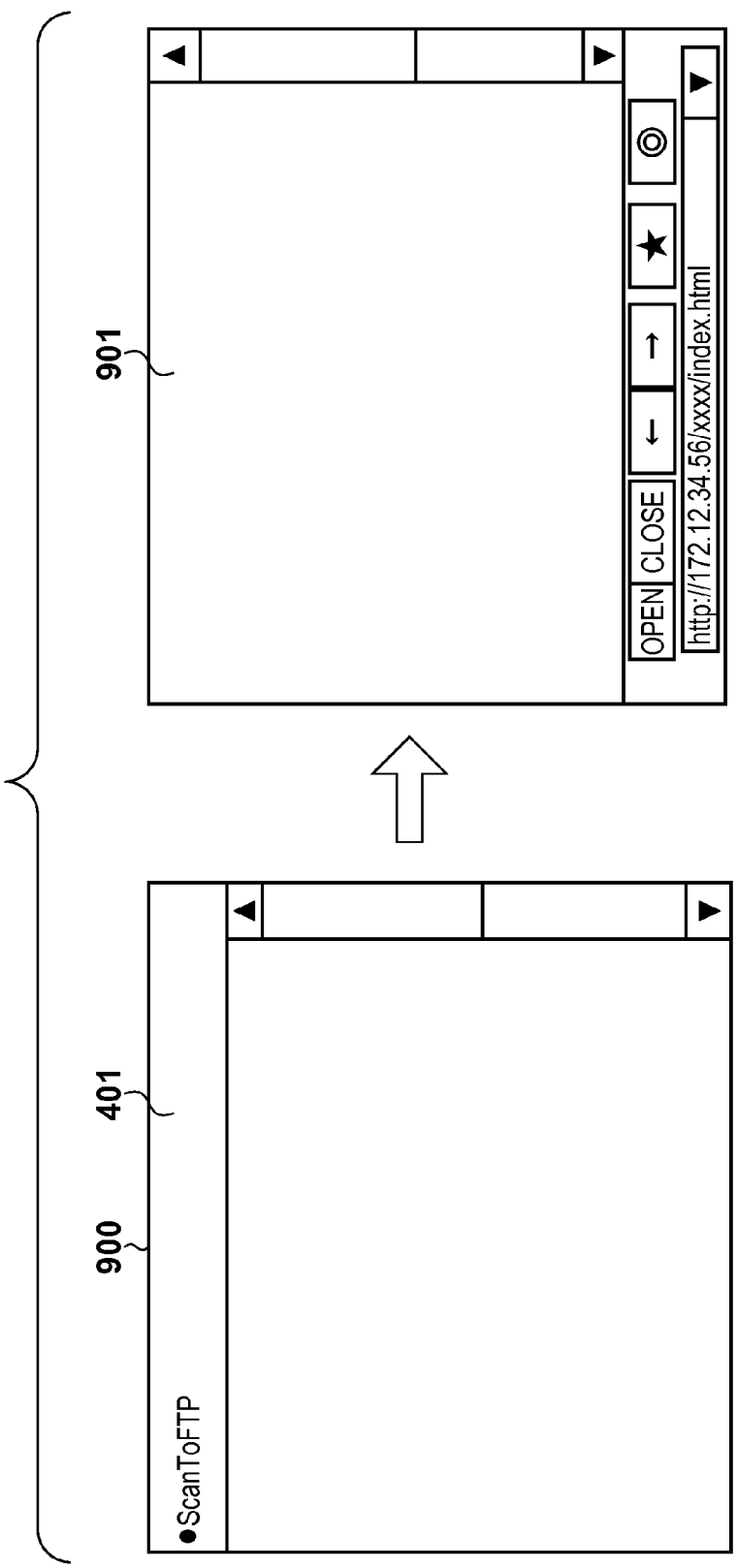
FIG. 9 is a diagram illustrating a screen transition based on the flowchart in FIG. 8 according to Embodiment 1.
Figure 10:
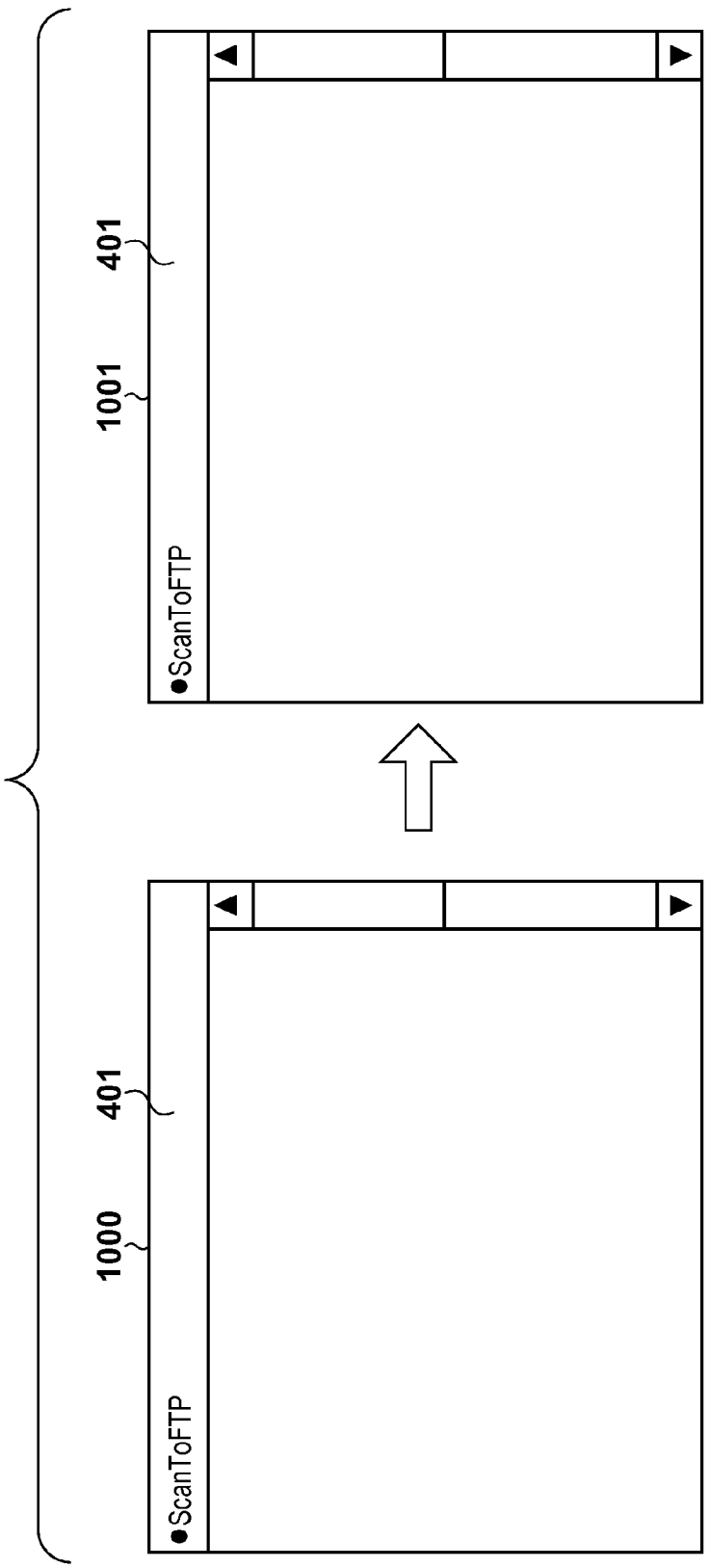
FIG. 10 is a diagram illustrating a screen transition based on the flowchart in FIG. 8 according to Embodiment 1.

FIGS. 9 and 10 are diagrams illustrating screen transitions based on the flowchart in FIG. 8 according to Embodiment 1.

A web browser screen 900 shows the case where among the web browser setting values shown in FIG. 7, "Restrict display of toolbar address portion" 701 and "Restrict display of toolbar buttons" 702 are both "ON", and "Maximize display mode" 703 is "OFF". Accordingly, in the web browser screen 900, the toolbar address portion 403 and buttons are both set to non-display, and the title display area 401 is displayed.

Also, it is assumed that before transitioning to the web browser screen 900, the value of "SETTING-TRANSFER" is "DOMAIN" in the response header information 601 that was received, and the take-over identifier 704 that is the web browser setting value 704 is "DOMAIN".

It is then assumed that there is a transition from this state to a web browser screen 901, and that the web browser screen 900 and the web browser screen 901 are web applications on different domains. It is also assumed that there is a JavaScript description for setting web browser setting values in the web browser screen 901. Specifically, among the web browser setting values shown in FIG. 7, "Restrict display of toolbar address portion" 701 and "Restrict display of toolbar buttons" 702 are both "OFF", and "Maximize display mode" 703 is "ON".

In this case, when a transition is made to the web browser screen 901, the take-over identifier 704 is cleared in step S112 since the domain is different and the value of the take-over identifier 704 is "DOMAIN". Accordingly, the web browser setting values that were set in the web browser screen 900 are not taken over. The content set by the JavaScript described in the web browser screen 901 is then reflected. Specifically, in the web browser screen 901, the toolbar address portion 403 and the buttons are both displayed, and the title display area is not displayed, which is the opposite of the web browser screen 900.

Next, a web browser screen 1000 in FIG. 10 shows the case where among the web browser setting values shown in FIG. 7, "Restrict display of toolbar address portion" 701 and "Restrict display of toolbar buttons" 702 are both "ON", and "Maximize display mode" 703 is "OFF". Also, it is assumed that before transitioning to the web browser screen 1000, the value of "SETTING-TRANSFER" is "ALL" in the response header information 601, and the take-over identifier 704 is "ALL".

Then there is a transition from this state to a web browser screen 1001. Here, the web browser screen 1000 and the web browser screen 1001 correspond to web applications that are on different domains. It is also assumed that there is a JavaScript description for setting web browser setting values in the web browser screen 1001. Specifically, among the web browser setting values shown in FIG. 7, "Restrict display of toolbar address portion" 701 and "Restrict display of toolbar buttons" 702 are both "OFF", and "Maximize display mode" 703 is "ON".

However, in this case, even if there is a transition to a screen on a different domain, the value of the take-over identifier 704 is "ALL" as described above, and therefore the web browser setting values described in JavaScript in the web browser screen 1001 are not reflected. Specifically, the screen is displayed in the state where the web browser setting values of the web browser screen 1000 have been taken over. In this example, even in the case of a transition to a screen on a different domain, the state in which only the title display area 401 is displayed is held.

As described above, according to Embodiment 1, in the case where there is a desire for web applications to display screens with the same web browser setting values on the same domain, the response header information "DOMAIN" is added to the first page of a web application. This enables screens to be displayed with the same web browser setting values on the same domain.

Also, in the case where there is a desire to continue processing as a part of the web application from which there is a screen transition by performing similar display even in a browser screen displayed by a web application on a different domain that is the screen transition destination, "ALL" is set in the header at the screen transition origin. This enables screens to be displayed with the same web browser setting values even when moving to a web application on a different domain.

According to this control, it is possible to allow web applications to more flexibly coordinate with each other by making it possible for web browser screen setting values to be taken over as necessary according to a web application. Also, a web application developer needs only describe a necessary header and JavaScript for reflecting web browser settings in the first page, thus facilitating maintenance.

Embodiment 2

Next is a description of Embodiment 2 of the present invention. Note that since the system configuration and the like of Embodiment 2 are the same as in Embodiment 1, the following description will focus on only portions that are different from Embodiment 1. In Embodiment 2, the web browser setting values described in Embodiment 1 above are held as favorite information.

Figure 11:
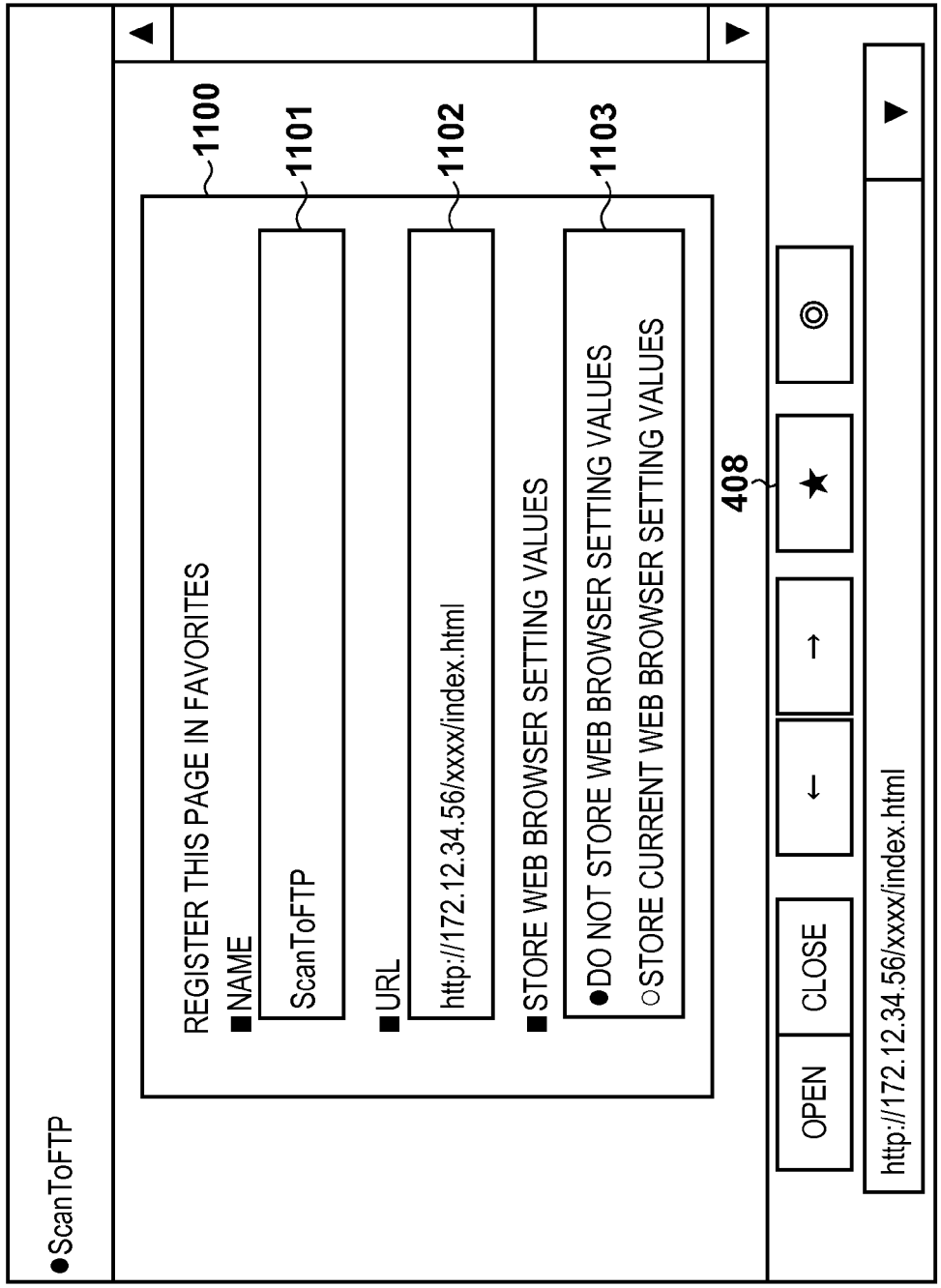
FIG. 11 is a diagram showing an example of a favorite registration screen after a screen transition when a favorite button in the web browser screen is pressed according to Embodiment 2.

FIG. 11 is a diagram showing an example of a favorite registration screen after a screen transition when the favorite button 408 in the web browser screen is pressed.

In a favorite registration dialog 1100, a name input portion 1101 enables the input of an arbitrary name as a favorite name. A URL input portion 1102 enables the input of an arbitrary URL that is to be registered as a favorite. When the favorite registration dialog 1100 is displayed, the page title and URL that were displayed at that time are automatically reflected in the name input portion 1101 and the URL input portion 1102. A web browser setting value storage selection portion 1103 enables the selection of whether the web browser setting values that are set at that time are to be registered. Here, in the case where it was selected that the current web browser setting value are also to be stored, when that favorite is called, the stored browser setting values are reflected at the same time as the favorite page is displayed.

Figure 12:
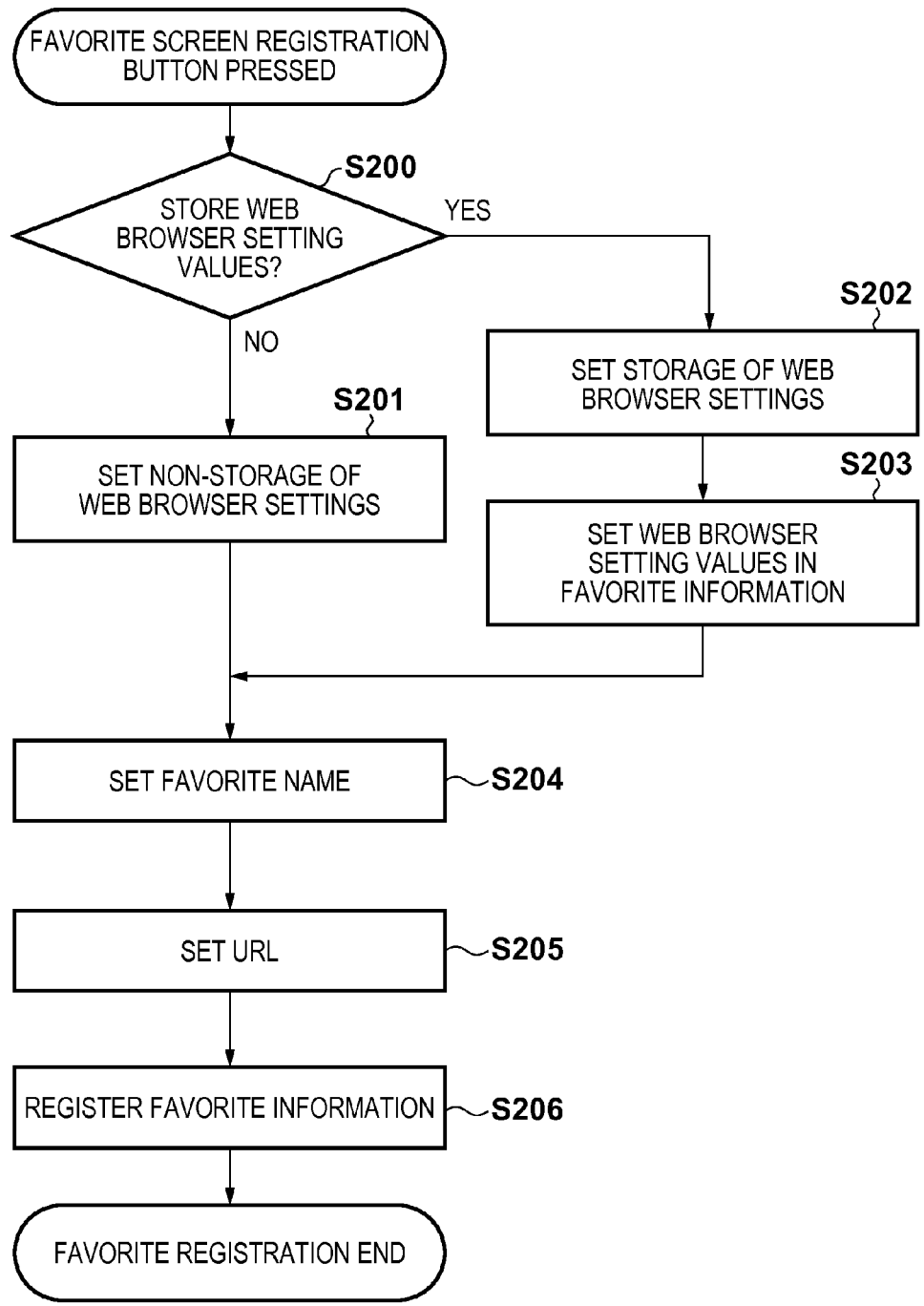
FIG. 12 is a flowchart illustrating processing in the case where favorite information was registered in a favorite registration dialog in an image forming apparatus according to Embodiment 2.

FIG. 12 is a flowchart illustrating processing in the case where favorite information was registered in the favorite registration dialog 1100 in the image forming apparatus according to Embodiment 2. Note that a program for executing this processing is stored in the ROM 131, and this processing is achieved by the CPU 130 executing this program.

First, in step S200, it is determined whether storage or non-storage of web browser setting values along with the favorite was selected in the web browser setting value storage selection portion 1103. In the case where non-storage was selected here, the procedure moves to step S201, in which non-storage of web browser setting values is set, and then the procedure moves to step S204. On the other hand, in the case where storage of web browser setting values was selected in step S200, the procedure moves to step S202, in which storage of web browser setting values is set. After step S202, the procedure moves to step S203, in which the web browser setting values at that time are set in the favorite information, and then the procedure moves to step S204. In Embodiment 2, the setting values 701 to 704 of the web browser setting values in FIG. 7 are set in the favorite information.

In step S204, the content input in the name input portion 1101 is set as the favorite title. Next, the procedure moves to step S205, in which the content input in the URL input portion 1102 is set as the favorite URL. Next, the procedure moves to step S206, in which the content that was set in steps S201 to S205 is registered as a favorite, and then this processing ends.

FIG. 13 is a diagram showing an example of favorite information that is registered in Embodiment 2. The web browser favorite information is held in the hard disk 106 as web browser favorite information, and items 1301 to 1308 are held as favorite information items. Here, a favorite No. 1301 is a unique identification number representing a place in the favorite order, and is automatically assigned when the favorite is registered. The favorite items 1302 to 1304 respectively hold the setting content of the name input portion 1101, the URL input portion 1102, and the web browser setting value storage selection portion 1103 of the favorite registration dialog 1100. Also, favorite items 1305 to 1308 respectively hold the setting content indicated by the web browser setting values 701 to 704 in FIG. 7.

Favorite information pieces 1309 and 1310 show specific examples of favorite information items that are held, and the number of favorite information pieces that are held is the same as the number of favorites that have been registered.

For example, in the case of the favorite information piece 1309, the name input portion 1101 and the URL input portion 1102 of the favorite registration dialog 1100 shown in FIG. 11 are registered, and this case corresponds to the case where "store" was selected in the web browser setting value storage selection portion 1103. Furthermore, the web browser setting values are set corresponding to the web browser setting values 701 to 704 in FIG. 7. Also, the case of the favorite information piece 1310 corresponds to the case where "do not store" was selected in the web browser setting value storage selection portion 1103, and the name and URL that were input in the name input portion and the URL input portion are registered.

Figure 14:
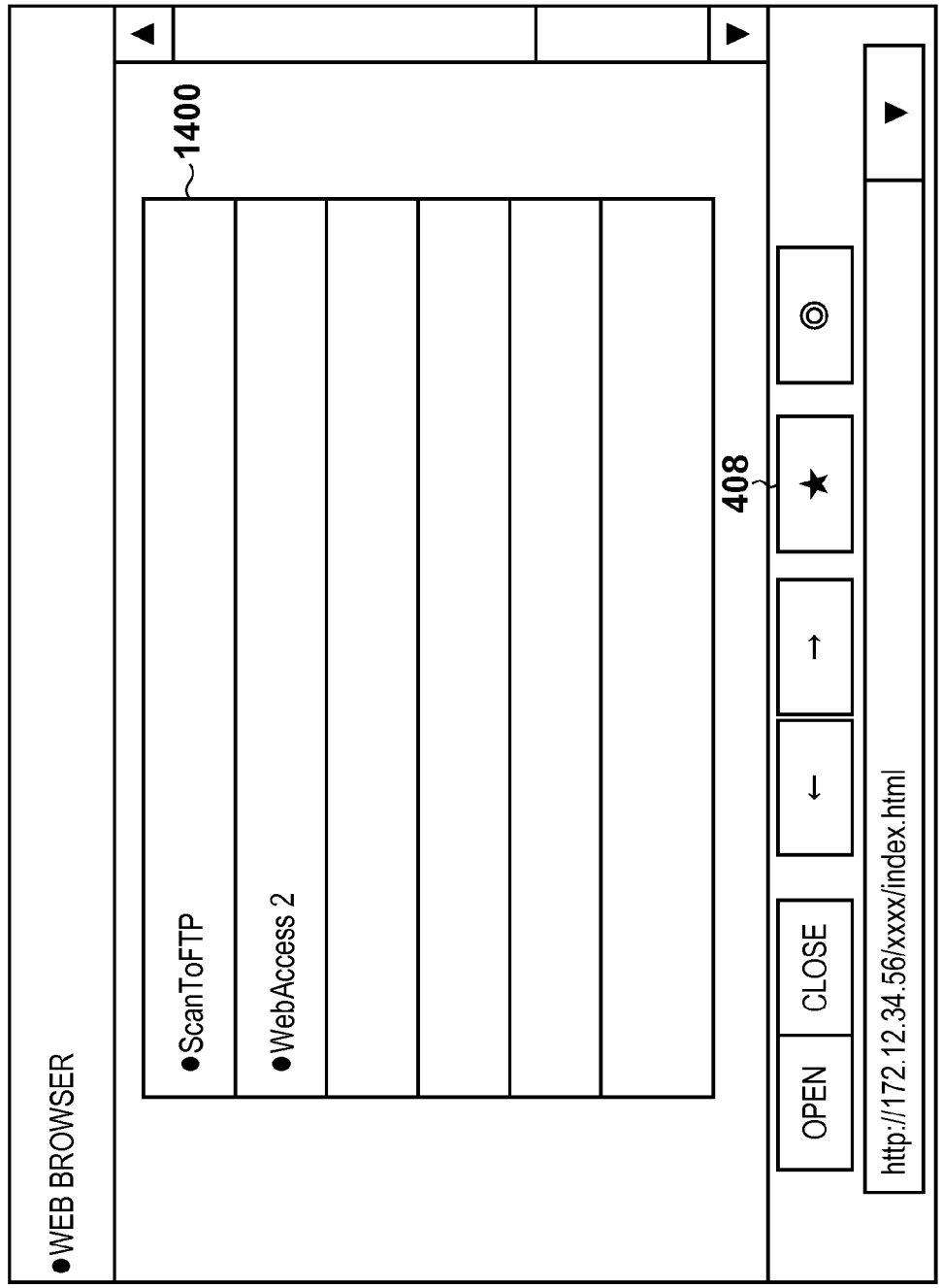
FIG. 14 is a diagram showing an example of a favorite list screen after a screen transition when a favorite button 408 was pressed in the web browser screen according to Embodiment 2.

FIG. 14 is a diagram showing an example of a favorite list screen after a screen transition when the favorite button 408 in the web browser screen is pressed.

FIG. 14 shows an example of a screen that is displayed in the case where the favorite button 408 was pressed in the previously described web browser screen in FIG. 4. A favorite list dialog 1400 displays the names 1302 that were registered in the favorite registration processing shown in the flowchart of FIG. 12, and when a name is selected, the designated URL is acquired, and the page is displayed. Here, two favorite names corresponding to the favorite information pieces 1309 and 1310 in FIG. 13 are displayed. When a displayed favorite name is selected here, a web browser screen corresponding to the selected favorite is displayed.

Figure 15:
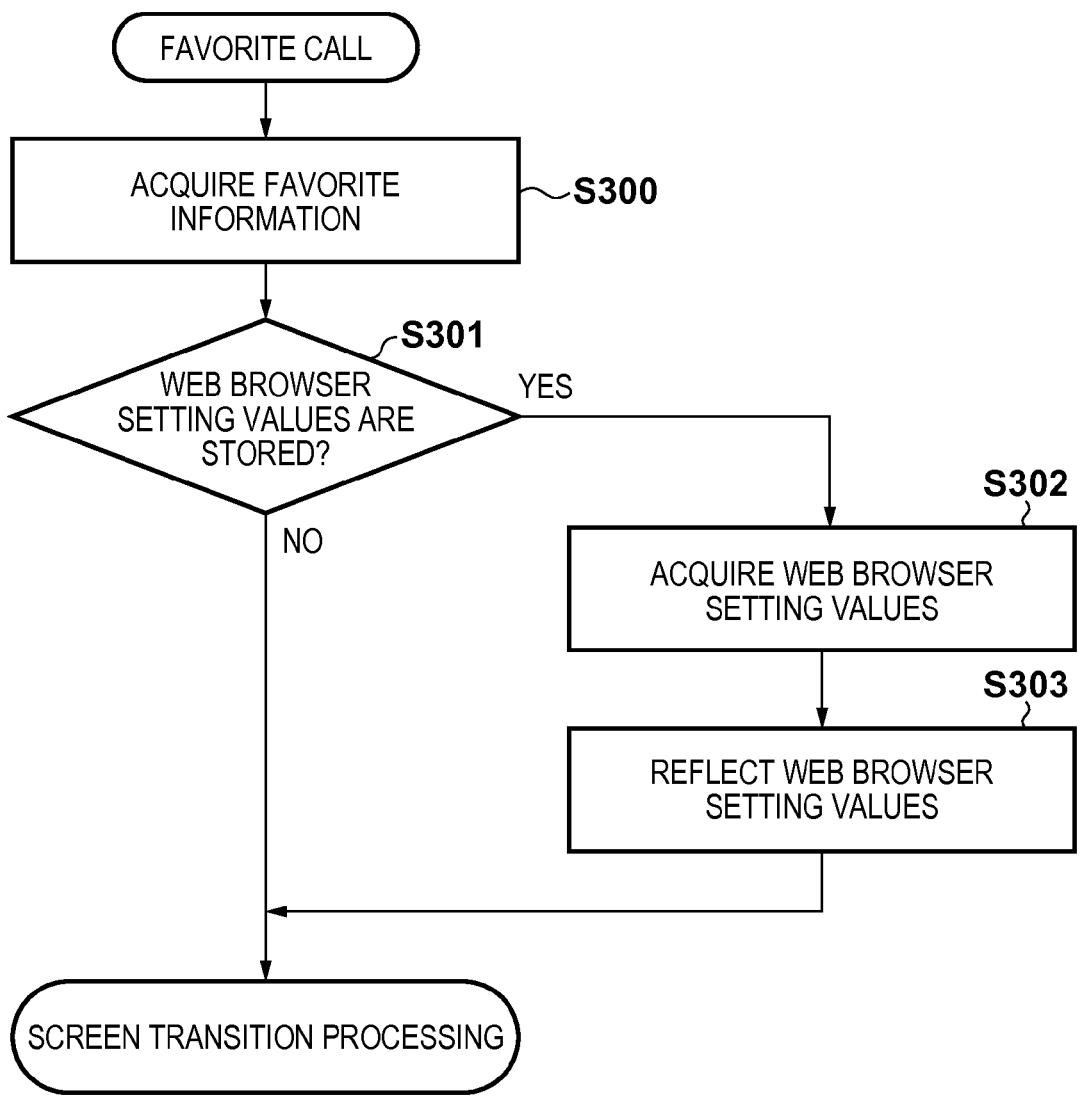
FIG. 15 is a flowchart illustrating web browser screen display processing based on a favorite that was selected in a favorite list dialog in the image forming apparatus according to Embodiment 2.

FIG. 15 is a flowchart illustrating web browser screen display processing based on a favorite that was selected in the favorite list dialog in the image forming apparatus according to Embodiment 2. Note that a program for executing this processing is stored in the ROM 131, and this processing is achieved by the CPU 130 executing this program.

When the web browser 204 receives a favorite call instruction, the procedure moves to step S300, in which the called favorite information piece is acquired from among the favorite information pieces. Next, the procedure moves to step S301, in which it is determined whether the web browser setting value item 1304, which was acquired in step S204, in the favorite information in FIG. 13 is set to "store". In the case where "do not store" is set, the procedure escapes the processing shown in this flowchart and moves to step S100 of the screen transition processing shown in the flowchart of FIG. 8.

On the other hand, in the case where it was determined in step S301 that the web browser setting value 1304 is set to "store", the procedure moves to step S302, in which the information of the items 1305 to 1308 related to web browser setting values is acquired from the web browser favorite information shown in FIG. 13. The procedure then moves to step S303, in which the web browser setting values 1305 to 1308 that were acquired in step S302 are reflected in the setting values 701 to 704 of the web browser setting values shown in FIG. 7. After step S303 is executed in this way, the procedure escapes the processing shown in this flowchart and moves to step S100 of the flowchart shown in FIG. 8.

According to Embodiment 2, even in the case where, for example, web browser setting values are changed after the user has registered a favorite during a screen transition, a browser screen having web browser setting values that are easy-to-use to the user can be displayed any time by designating that favorite.

As described above, according to the embodiments of the present invention, whether a web browser screen setting value, that is to say, a web browser operation specification, is to be taken over can be controlled as necessary according to a web application. Accordingly, even in the case where a user uses web applications that are on different domains, screen operations can be performed with little unpleasantness for the user.

Also, maintenance is facilitated for web application developers as well, since a necessary description can be included on only the first page, and a setting can be made such that the web browser setting values are taken over in the following pages.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-147741 filed on Jul. 1, 2011, which is hereby incorporated by reference herein in its entirety.

What is claimed is:

1. An information processing apparatus, comprising:
a processor; and
a memory storing a program which, when executed by the processor, causes the information processing apparatus to:
receive first screen information and first setting information for determining a display specification of a web browser, from a web server;
display a first screen on the web browser based on the first screen information, the display specification of the web browser being determined based on the first setting information; and
change the display specification of the web browser based on the second setting information, in a case where second screen information, second setting information for determining the display specification of the web browser, and predetermined information are received from the web server after the first screen is displayed,
wherein the display specification of the web browser is not changed based on the second setting information, in a case where the second screen information and the second setting information are received from the web server without receiving the predetermined information after the first screen is displayed, and wherein the predetermined information is information for determining whether the display specification of the web browser is to be taken over.

2. The information processing apparatus according to claim 1, wherein the predetermined information is information for determining that the display specification of the web browser is to be taken over in the same domain.

3. The information processing apparatus according to claim 1, wherein the display specification of the web browser is display or non-display of at least any one of a toolbar address, a function button, or a title display of the web browser.

4. The information processing apparatus according to claim 1, wherein the program, when executed by the processor, further causes the information processing apparatus to:

register a web page as favorite information;

store the display specification of the web browser along with the favorite information when the registration is performed; and display the web page in accordance with the stored display specification of the web browser, when an instruction is given regarding the registered favorite information.

5. An information processing apparatus control method comprising:

receiving first screen information and first setting information for determining a display specification of a web browser, from a web server;

displaying a first screen on the web browser based on the received first screen information, the display specification of the web browser being determined based on the received first setting information; and changing the display specification of the web browser based on the second setting information, in a case where second screen information, second setting information for determining the display specification of the web browser, and predetermined information are received after the first screen is displayed, wherein, in a case where the second screen information and the second setting information are received without receiving the predetermined information after the first screen is displayed, the display specification of the web browser is not changed based on the second setting information, and wherein the predetermined information is information for determining whether the display specification of the web browser is to be taken over.

6. A non-transitory computer-readable storage medium storing a computer program for causing a computer to execute an information processing apparatus control method, the information processing apparatus control method comprising:

receiving first screen information and first setting information for determining a display specification of a web browser, from a web server;

displaying a first screen on the web browser based on the received first screen information, the display specification of the web browser being determined based on the received first setting information; and changing the display specification of the web browser based on the second setting information, in a case where second screen information, second setting information for determining the display specification of the web browser, and predetermined information are received after the first screen is displayed, wherein, in a case where the second screen information and the second setting information are received without receiving the predetermined information after the first screen is displayed, the display specification of the web browser is not changed based on the second setting information, and wherein the predetermined information is information for determining whether the display specification of the web browser is to be taken over.

7. The information processing apparatus according to claim 1, wherein the display specification of the web browser is determined based on the first setting information, in a case where the second screen information and the second setting information are received from the web server without receiving the predetermined information after the first screen is displayed.

* * * * *